Aug. 31, 1965  C. H. BECKER  3,203,059
FASTENER CLIP MEMBER
Filed Jan. 22, 1963
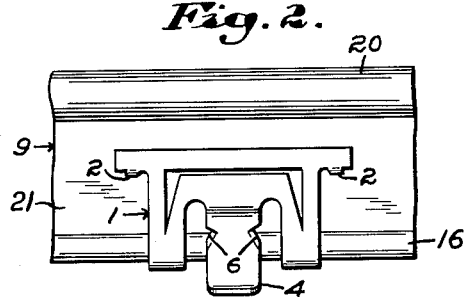
Fig. 1.
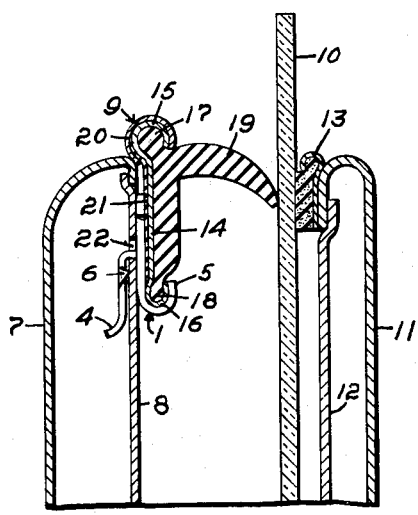
Fig. 3.
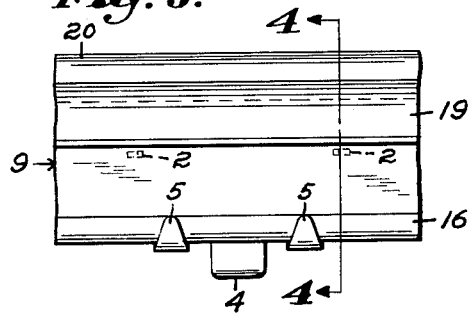
Fig. 4.
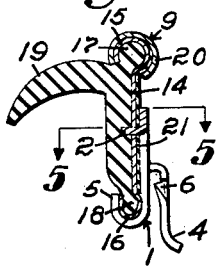
Fig. 5.
Fig. 6.
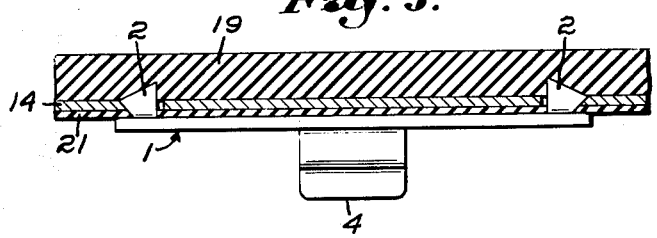
Fig. 7.
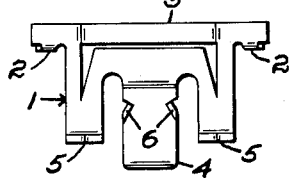
Fig. 8.
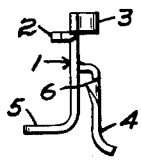
Inventor:
Charles H. Becker,
by Walter P. Jones
Atty.

United States Patent Office 3,203,059
Patented Aug. 31, 1965

3,203,059
FASTENER CLIP MEMBER
Charles H. Becker, Braintree, Mass., assignor to United-Carr Incorporated, a corporation of Delaware
Filed Jan. 22, 1963, Ser. No. 253,157
1 Claim. (Cl. 24—73)

This invention relates to fastener clip members and installations thereof.

An object of the invention is to provide a combination fastener clip member and at least two parts to be held in assembly which includes a novel clip construction combined with the two parts whereby the clip is attached by opposed hook-like members pressed into engagement with one of said parts and the hook-like members are held in interlocked engagement with the part by a hook moving, flattenable, originally bowed portion.

Another object of the invention is to provide an improvide, simple fastener clip member having a plate-like portion which may be attached to a part by opposed hook-like members, a hook moving portion and a means for engagement with another part to be assembled with said first-mentioned part.

In the drawings:

FIG. 1 is a sectional view through a portion of a motor vehicle door and window construction;

FIG. 2 is a view of a portion of the outer weather strip portion shown in FIG. 1;

FIG. 3 is a view of the reverse side of FIG. 2;

FIG. 4 is a section taken on the line 4—4 of FIG. 3;

FIG. 5 is a section taken on the line 5—5 of FIG. 4;

FIG. 6 is a sectiton similar to FIG. 5 prior to final attachment of the fastener clip to the weather strip;

FIG. 7 is an elevational view of the improved fastener clip member; and

FIG. 8 is an edge view of the fastener clip member shown in FIG. 7, as viewed from the right hand side thereof.

Referring now to the specific form of fastener clip member 1, illustrated by the drawings, there is shown (FIGS. 6, 7, and 8) a one-piece device having a plate-like portion adjacent the upper edge of which is provided two hook-like portions 2—2 between which is provided an initially bowed hook moving and holding portion 3. There is also provided a yieldable, finger 4 between two bendable prongs 5—5. The fastener clip member 1 is preferably formed as a stamping from metal which is of a temper to permit the finger 4 to remain springy while permitting the bowed portion 3 to be flattened and stay put and also permitting the prongs 5—5 to be bent into tight engagement with a part. The yieldable finger 4 may also have one or more barbs 6, if necessary, to hold a part between it and the plate-like portion as will be described hereafter.

While the fastener clip member 1, described above, is shown as being used to hold a weather strip in place in a door construction of a motor vehicel or the like, it should be understood that the clip member may be used in other installations, such as for holding a wire or tube in place in any suitable construction. Other uses of the fastener clip will be obvious to anyone skilled in the art.

Referring now to the construction of the improved fastener clip member, illustrated in FIG. 1, there is shown a portion of a motor vehicle door window construction. This construction includes the outer door portion 7 and the inner panel 8, outer weather strip 9, window pane 10, inner door portion 11, inner door portion panel 12, and inner weather strip 13. FIGS. 2, 3, 4, 5, and 6 illustrate only the outer weather strip 9 and an improved fastener clip member.

The outer weather strip 9 includes a metal strip 14 crimped at its upper and lower edges 15 and 16 over edges 17 and 18 of a flexible window engaging portion 19, as clearly shown in FIG. 4. A trim bead strip 20 is assembled to the upper edge of the weather strip 9 over the upper edge 15 of the metal strip 14. The combination of the outer weather strip 9 also includes a thin cushion strip 21 which may be adhesively secured to the metal strip 14 and at least one upper edge of this cushion strip 21 is held in place by the bead strip 20, as shown in FIGS. 1 and 4.

The fastener clip member 1 is preferably assembled to the outer weather strip 9 by first pressing the hook-like portions 2—2 through the cushion strip 21 and the metal strip 14 in a self-piercing manner, by the use of any suitable tool or tools, until the parts reach the arrangement shown in FIG. 6. Thereafter, the bowed portion 3 is flattened by any suitable tool thereby causing the hook-like portions 2—2 to move away from each other and hook into interlocking engagement with the metal strip 14, as shown in FIG. 5. In this position the fastener clip member cannot become accidentally disassembled from the outer weather strip 9. In order to assist in holding the fastener clip member 1 in place the bendable prongs 5—5 are now bent over the lower crimped edge 16 of the metal strip 14 as shown in FIGS. 1, 3, and 5.

During the assembly of the door construction shown in FIG. 1, the outer weather strip 9 is secured in place by a suitable number of fastener clip members 1, according to the length of the strip desired, by inserting the yieldable finger 4 through an aperture 22 in the inner door panel 8 and hooking it into the position shown in FIG. 1. With this type of construction the panel 8 is gripped between the yieldable finger 4 and the plate-like portions of the fastener clips and the barbs 6 dig into the panel 8 and keep the weather strip 9 from moving out of position in the door construction.

While there has been illustrated and described an improved fastener clip member and a particular installation thereof, it should be understood that variations in the clip construction and the installation, with which the improved clips is used, may be made without departing from the scope of the inventions which are best defined by the following claim.

I claim:

A fastener clip member for holding two or more parts in assembly, said fastener clip member having a plate-like portion provided with opposed, flat, self-piercing, hook-like portions in edgewise alignment, a bowed portion between the hook-like portions for moving them into interlocking engagement with one of said parts when said bowed portion is flattened and a yieldable spring-like finger also extending from said plate-like portion to co-operate with said plate-like portion to engage the other of said parts to be held by said fastener clip member.

References Cited by the Examiner
UNITED STATES PATENTS 2,500,297 3/50 Schunk _____ 20—69
2,952,343 9/60 Modrey _____ 24—213 X
2,965,874 12/60 Modrey _____ 24—213 X HARRISON R. MOSELEY, Primary Examiner.